United States Patent
Sloo

(10) Patent No.: US 9,323,790 B2
(45) Date of Patent: Apr. 26, 2016

(54) MEDIA CONTENT CATALOGS

(71) Applicant: Microsoft Corporation, Redmond, WA (US)

(72) Inventor: David H. Sloo, Menlo Park, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/188,092

(22) Filed: Feb. 24, 2014

(65) Prior Publication Data
US 2014/0195910 A1   Jul. 10, 2014

Related U.S. Application Data

(63) Continuation of application No. 11/640,700, filed on Dec. 18, 2006, now Pat. No. 8,706,777.

(51) Int. Cl.
*G06F 17/30* (2006.01)
*G06F 3/0484* (2013.01)

(52) U.S. Cl.
CPC ........ *G06F 17/30286* (2013.01); *G06F 3/0484* (2013.01); *G06F 17/30058* (2013.01); *G06F 17/30864* (2013.01)

(58) Field of Classification Search
CPC ............ G06F 17/30058; G06F 17/286; G06F 17/30864; G06F 17/30554
USPC ............. 707/728, 770, 805; 715/716; 725/46; 709/217; 345/810
See application file for complete search history.

(56) References Cited

U.S. PATENT DOCUMENTS

| | | |
|---|---|---|
| 6,609,253 B1 | 8/2003 | Swix et al. |
| 8,296,295 B2 | 10/2012 | Morton et al. |
| 2002/0147645 A1 | 10/2002 | Alao et al. |
| 2002/0180803 A1* | 12/2002 | Kaplan et al. ................. 345/810 |
| 2004/0060063 A1 | 3/2004 | Russ et al. |
| 2004/0163117 A1 | 8/2004 | Rodriguez et al. |
| 2004/0213273 A1 | 10/2004 | Ma |
| 2004/0268386 A1 | 12/2004 | Logan et al. |
| 2005/0076092 A1 | 4/2005 | Chang et al. |

(Continued)

FOREIGN PATENT DOCUMENTS

EP    1868324    12/2007

OTHER PUBLICATIONS

Cranor et al., "Enhanced Streaming Services in a Content Distribution Network", <http://www.cs.ucc.ie/misl/publications/files/ieeeicompsreenan.pdf#search=%22%22Enhanced%20streaming%20services%20in%20a%20content%20distribution%20network%22%22>, (2001), 10 pages.

(Continued)

*Primary Examiner* — Shahid Alam
(74) *Attorney, Agent, or Firm* — Aaron Chatterjee; Fehmi Chebil; Micky Minhas

(57) ABSTRACT

In a method in a computer system for displaying on a display device a personal catalog of media content, a plurality of media content listings is received from a plurality of network enabled media devices. The plurality of network enabled media devices has common ownership with the computer system, which comprises a network enabled media device. The plurality of media content listings and a media content listing of the computer system are used to compile a personal catalog of media content. The personal catalog of media content is displayed on the display device.

20 Claims, 9 Drawing Sheets

(56) References Cited

U.S. PATENT DOCUMENTS

| | | |
|---|---|---|
| 2005/0169467 A1 | 8/2005 | Risan et al. |
| 2005/0278729 A1 | 12/2005 | Lamkin et al. |
| 2006/0025132 A1 | 2/2006 | Karaoguz et al. |
| 2006/0149813 A1 | 7/2006 | Janik |
| 2006/0173974 A1* | 8/2006 | Tang .............................. 709/217 |
| 2008/0109852 A1 | 5/2008 | Kretz et al. |
| 2012/0317101 A1 | 12/2012 | Jones et al. |

OTHER PUBLICATIONS

Harville et al., "An architecture for componementized, network-based media services", <http://www.hpl.hp.com/personal/Michael_Harville/papers/icme03-final.pdf#search=%22%22An%20architecture%20for%20compontized%2C%20network-based%20media%>, Jul. 6-9, 2003, 4 pages.

Manjunath et al., "Smart Edge Server—Beyond a Wireless Access Point", <http://akebono.stanford.edu/users/tajana/papers/wmash04.pdf>, Oct. 2004, 10 pages.

Tokmakoff, Andrew, "Avatars, Interaction and Next-Generation Television", Telematica Institute, https://doc.telin.nl/dscgi/ds.py/Get/File-21488/tokmakoff_icme2002.pdf#search=%22%22%20Avatars%2C%20interaction%20and%20next-generation%20television%20%22%22>, (2002) 4 pages.

* cited by examiner

400

RECEIVING A PLURALITY OF MEDIA CONTENT LISTINGS FROM A PLURALITY OF NETWORK ENABLED MEDIA DEVICES OF COMMON OWNERSHIP TO THE COMPUTER SYSTEM.
410

UTILIZING THE PLURALITY OF MEDIA CONTENT LISTINGS AND A MEDIA CONTENT LISTING OF THE COMPUTER SYSTEM TO COMPILE A PERSONAL CATALOG OF MEDIA CONTENT, WHEREIN THE COMPUTER SYSTEM COMPRISES A NETWORK ENABLED MEDIA DEVICE.
420

DISPLAYING THE PERSONAL CATALOG OF MEDIA CONTENT ON THE DISPLAY DEVICE.
430

UTILIZING A FIRST NETWORK ENABLED MEDIA DEVICE TO DISCOVER A SECOND NETWORK ENABLED MEDIA DEVICE OF COMMON OWNERSHIP.
810

UTILIZING A UNION OF A MEDIA CONTENT LISTING FROM THE FIRST NETWORK ENABLED MEDIA DEVICE AND A MEDIA CONTENT LISTING FROM THE SECOND NETWORK ENABLED MEDIA DEVICE TO COMPILE A PERSONAL CATALOG OF MEDIA CONTENT.
820

INCLUDING DISPLAYABLE MEDIA ITEM METADATA IN THE PERSONAL CATALOG OF MEDIA CONTENT.
830

FIG. 8

MEDIA CONTENT CATALOGS

CROSS-REFERENCE TO RELATED APPLICATION

The present application is related to U.S. patent application Ser. No. 11/640,700, entitled, "Media Content Catalogs" and filed on Dec. 18, 2006, which is specifically incorporated by reference for all that it teaches and discloses.

BACKGROUND

Media content today is available in a variety of formats for use on a variety of media devices. Media content exists in physical formats, such as, for example, Compact Disks (CDs) and Digital Versatile Disks (DVDs) which may be inserted into a suitable media device for playing. Media content may also be stored in digital format, such as, for example, on the hard drive of a personal computer. Media content may also be stored in a digital format in memory or data storage of a hand-holdable/portable device such as a personal media device which is capable of playing audio media, video media, or some combination. Media content may also be digitally streamed, such as from a media service to a media device such as a radio receiver or a television decoder box (Internet Protocol Television, for example). Some examples of streaming media delivery include delivery of streaming media from a media service via the internet, a wireless terrestrial link, or a satellite link.

Because of the variety of media devices and media formats, a person may own or have rights to media in a variety of different formats and/or on a variety of different media devices. Besides the confusion and the physical and technical barriers caused by this situation. This dispersal of media content upon a variety of media devices and in a variety of formats can result in a situation where a user is unaware of the media content that he owns, the location of the media content he owns, or the rights that he has for a particular piece of media content. For example, this lack of awareness can cause a user to needlessly purchase the same media content multiple times, because he is unaware that he already owns or has rights to it, or because does not know where it is located. Such a negative experience can undesirably present an intellectual barrier which impedes a users continuing purchase of media content.

Thus, a technology for improving a user's awareness of media content, which addresses some of the above disadvantages, would be advantageous.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A technology for media content catalogs is disclosed. The technology provides method and systems for compiling and displaying a catalog of media content, such as a personal catalog of media content compiled from a plurality of media content listings received from a plurality of commonly owned network enabled media devices, or a shared catalog of media content compiled from media content listings received from one or more commonly owned network enabled media devices and one or more non-commonly owned network enabled media devices. A catalog of media content may be compiled by a network enabled media device or by a media server associated with a media service. A catalog of media content may then be displayed on a display device of, or associated with, a network enabled media device. A catalog of media content may comprise a variety of metadata about the media items listed in the catalog. Varying amounts of the metadata from a catalog of media content may optionally be displayed on a display device along with a respective media item from the catalog.

DESCRIPTION OF THE DRAWINGS

The accompanying drawings, which are incorporated in and form a part of this specification, illustrate embodiments of the technology for media content catalogs and, together with the description, serve to explain principles discussed below:

FIG. 4 is a flow diagram of operations performed in accordance with an embodiment of the present technology.

FIG. 8 is another flow diagram of operations performed in accordance with an embodiment of the present technology.

The drawings referred to in this description should be understood as not being drawn to scale unless specifically noted.

DETAILED DESCRIPTION

Reference will now be made in detail to embodiments of the present technology for media content catalogs, examples of which are illustrated in the accompanying drawings. While the technology for media content catalogs will be described in conjunction with various embodiments, it will be understood that they are not intended to limit the present technology for media content catalogs to these embodiments. On the contrary, the presented technology for media content catalogs is intended to cover alternatives, modifications and equivalents, which may be included within the spirit and scope the various embodiments as defined by the appended claims. Furthermore, in the following detailed description, numerous specific details are set forth in order to provide a thorough understanding of the present technology for media content catalogs. However, the present technology for media content catalogs may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "receiving", "utilizing", "displaying", "compiling", "recompiling", "including", and "discovering", or the like, refer to the actions and processes of a computer system (such as computer 100 of FIG. 1), or similar electronic computing device or network enabled media device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology for media content catalogs is also well suited to the use of other computer systems such as, for example, optical and virtual computers. Additionally, it should be understood that in embodiments of the present technology for media content catalogs, one or more of the steps can be performed manually.

Example Computer System Environment

Figure 1:
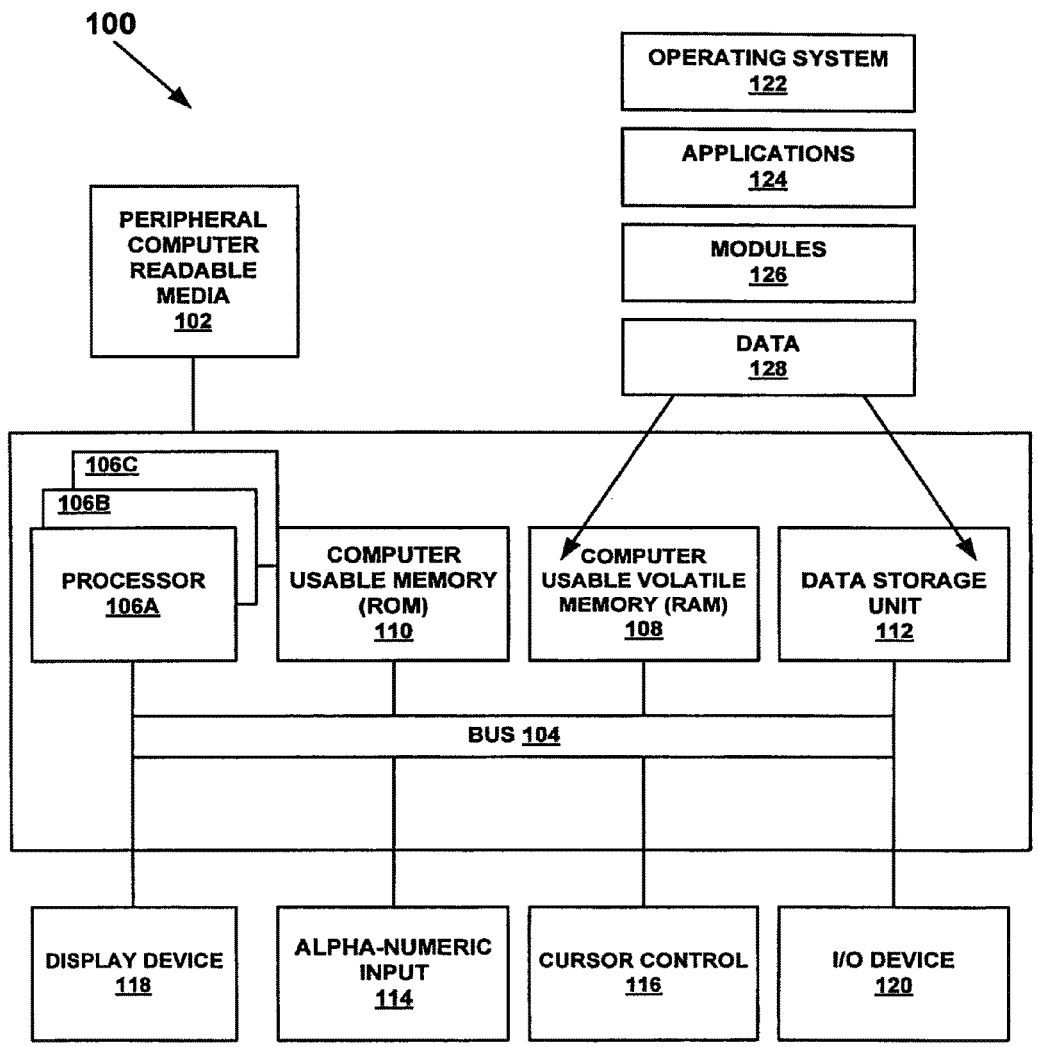
FIG. 1 is a diagram of an example computer system used in accordance with various embodiments of the present technology.

With reference now to FIG. 1, portions of the technology for media content catalogs are composed of computer-readable and computer-executable instructions that reside, for example, in computer-usable media of a computer system. That is, FIG. 1 illustrates one example of a type of computer that can be used to implement embodiments, which are discussed below, of the present technology for media content catalogs. FIG. 1 illustrates an example computer system 100 used in accordance with embodiments of the present technology for media content catalogs. It is appreciated that system 100 of FIG. 1 is only an example and that the present technology for media content catalogs can operate on or within a number of different computer systems including general purpose networked computer systems, embedded computer systems, routers, switches, server devices, client devices, various intermediate devices/nodes, stand alone computer systems, personal media devices, internet protocol television devices, internet protocol media players, and a variety of network enabled media devices.

As shown in FIG. 1, computer system 100 of FIG. 1 is well adapted to having an optional peripheral computer readable media 102 such as, for example, a floppy disk, a compact disc, and the like coupled thereto. System 100 of FIG. 1 includes an address/data bus 104 for communicating information, and a processor 106A coupled to bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, e.g. random access memory (RAM), coupled to bus 104 for storing information and instructions for processors 106A, 106B, and 106C. System 100 also includes computer usable non-volatile memory 110, e.g. read only memory (ROM), coupled to bus 104 for storing static information and instructions for processors 106A, 106B, and 106C. Also present in system 100 is an optional data storage unit 112 (e.g., a magnetic or optical disk and disk drive) coupled to bus 104 for storing information and instructions. System 100 also includes an optional alphanumeric input device 114 including alphanumeric and function keys coupled to bus 104 for communicating information and command selections to processor 106A or processors 106A, 106B, and 106C. System 100 also includes an optional cursor control device 116 coupled to bus 104 for communicating user input information and command selections to processor 106A or processors 106A, 106B, and 106C. System 100 of the present embodiment also includes an optional display device 118 coupled to bus 104 for displaying information.

Referring still to FIG. 1, optional display device 118 of FIG. 1 may be a liquid crystal device, cathode ray tube, plasma display device or other display device suitable for creating graphic images and alphanumeric characters recognizable to a user. Optional cursor control device 116 allows the computer user to dynamically signal the movement of a visible symbol (cursor) on a display screen of display device 118. Many implementations of cursor control device 116 are known in the art including a trackball, mouse, touch pad, joystick or special keys on alpha-numeric input device 114 capable of signaling movement of a given direction or manner of displacement. Alternatively, it will be appreciated that a cursor can be directed and/or activated via input from alpha-numeric input device 114 using special keys and key sequence commands. System 100 is also well suited to having a cursor directed by other means such as, for example, voice commands. System 100 also includes an optional I/O device 120 for coupling system 100 with external entities. For example, in one embodiment, I/O device 120 is a modem for enabling wired or wireless communications between system 100 and an external network such as, but not limited to, the Internet and/or a computer network.

Referring still to FIG. 1, various other optional components are depicted for system 100. Specifically, when present, an operating system 122, applications 124, modules 126, and data 128 are shown as typically residing in one or some combination of computer usable volatile memory 108, e.g. random access memory (RAM), and data storage unit 112. In one embodiment, the present technology for media content catalogs, for example, is stored as an application 124 or module 126 in memory locations within RAM 108 and memory areas within data storage unit 112.

Overview

The following discussion will begin with a description of example network enabled media devices and example environments within which embodiments of the technology for media content catalogs may be implemented. Discussion will then proceed to a description of the structure of media catalog displaying system 300. Operation of components of system 300 will be described in greater detail in conjunction with discussion of an implementation of an example method for displaying a personal catalog of media content on a display device. Discussion will proceed to a description of components of system 300 used in an example method for compiling a catalog of media content. Example media content listings and displays will be discussed to further illustrate these methods.

Example Network Enabled Media Devices and Environments

Figure 2:
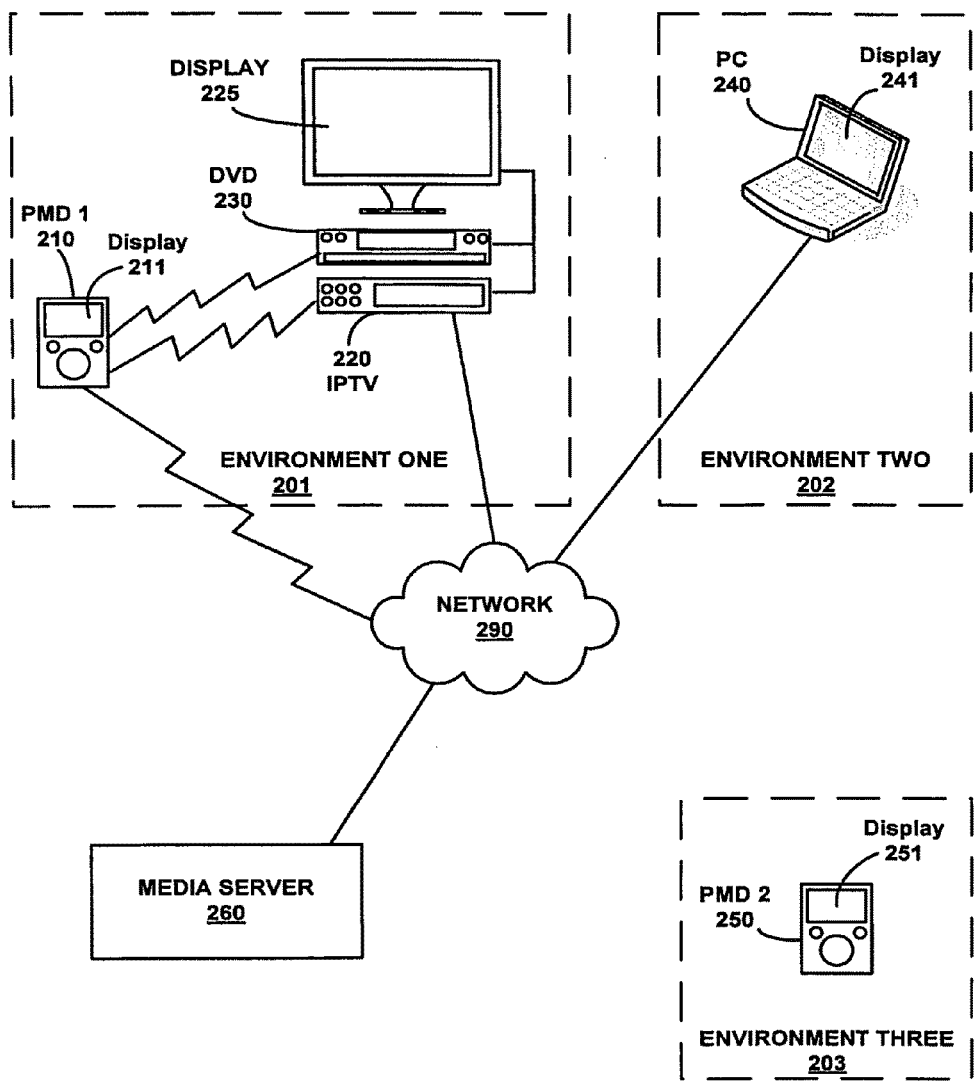
FIG. 2 is a diagram of example network enabled media devices and environments in which embodiments of the present technology may be implemented.

FIG. 2 is a diagram of example network enabled media devices (210, 220, 230, 240, and 250) and example environments (201, 202, and 203) in which embodiments of the present technology may be implemented.

For purposes of example, and not of limitation, environment one (201) represents a location, such as, for example a home. In environment one (201) a plurality of network enabled media devices are present. The network enabled media devices in environment one (201) include: a network enabled personal media device (PMD) 210; a network enabled digital versatile disk (DVD) player 230; and a network enabled internet protocol television (IPTV) transceiver 220. It is appreciated that in other environments, in accordance with concepts of the present technology, a greater or lesser number and/or different types of network enabled media devices may be present.

Personal media device 210 is a portable/hand-holdable personal media device, such as is known in the art for playback of video and/or audio files which may be streamed or stored in memory or storage of PMD 210. PMD 210 is network enabled in that it may be wired or wirelessly coupled with one or more other network enabled media devices and/or with a network (for example, a home network or the Internet). In FIG. 2, PMD 210 is shown wirelessly coupled to DVD 230, IPTV 220, and network 290. PMD 210 is configured with a display 211 (similar to display device 118) for viewing and interacting with media content, media content lists, and a media content catalog (as will be described herein).

In FIG. 2, DVD 230 is shown coupled to display 225 for playback of digital versatile disks such in a viewable manner. DVD 230 is network enabled in that it may be wired or wirelessly coupled to one or more other network enabled media devices and/or with a network (for example a home network or the Internet). In FIG. 2, DVD 230 is shown wirelessly coupled to PMD 210. Via a coupling to display 225, DVD 230 may also display media content, a media content listing of media items currently residing in DVD 230, a media content listing comprising an historical list of media items played on DVD 230, and/or a media content catalog (as will be described herein).

In FIG. 2, IPTV 220 is shown coupled to display 225 for playback of digital versatile disks such in a viewable manner. IPTV 220 represents a cable or satellite receiver or transceiver for receiving content which may be visually displayed on display 225. IPTV 220 is network enabled in that it may be wired or wirelessly coupled to one or more other network enabled media devices and/or with a network (for example a home network or the Internet). In FIG. 2, IPTV 220 is shown wirelessly coupled to DVD 230 and coupled via signal line to network 290. Via a coupling to display 225, IPTV 220 may also display a media content listing of media items currently residing in IPTV 220, a media content listing comprising an historical list of media items played on IPTV 220, and/or a media content catalog (as will be described herein).

For purposes of example, and not of limitation, environment two (202) represents a location, such as, for example an office at a distant location from environment one (201). In environment two (202) a personal computer 240 is present. It is appreciated that in other environments, in accordance with concepts of the present technology, a greater or lesser number and/or different types of network enabled media devices may be present.

PC 240 may be operated, in one embodiment, as a network enabled media device for the playback of media (audio and video) stored in memory or storage features of PC 240 or streamed to PC 240. PC 240 is network enabled in that it may be wired or wirelessly coupled to one or more other network enabled media devices and/or with a network (for example a home network or the Internet). In FIG. 2, PC 240 is shown coupled via signal line to network 290. PC 240 is configured with a display 241 (similar to display device 118) for viewing and interacting with media content, media content lists, and/or a media content catalog (as will be described herein). For purposes of example, and not of limitation, PC 240 will be considered to be commonly owned and operated by an owner of PMD 210, DVD 230, and IPTV 220.

For purposes of example, and not of limitation, environment three (203) represents a location, such as, for example a coffee shop at a distant location from environment one (201) and environment two (202). In environment three (203) a second personal media device 250 is present. It is appreciated that in other environments, in accordance with concepts of the present technology, a greater or lesser number and/or different types of network enabled media devices may be present.

PMD 250 is similar to PMD 210, and is configured with a display 251 (similar to display device 118) for viewing and interacting with media content, media content lists, and/or a media content catalog (as will be described herein). PMD 250 is network enabled in that it may be wired or wirelessly coupled with one or more other network enabled media devices and/or with a network (for example, home network or the Internet). Although no network enabled devices or networks are shown coupled to PMD 250, it is appreciated that when a network or device is present, PMD 250 is capable of coupling with it. For example, in one embodiment, when PMD 210 is moved from environment one (201) to environment three (203), PMD 250 and PMD 210 wirelessly couple with one another.

In FIG. 2, network 290 represents the internet. For purposes of clarity and simplicity of description, PMD 210, IPTV 220, and PC 240 are shown directly coupled to network 290. However, it is appreciated that in some embodiments there may exist intermediate networks which are not shown.

In FIG. 2, media server 260 represents a server of a media service which delivers media content such as audio and/or video media content to connected network enabled media devices. In some instances the delivered content is streamed for near simultaneous consumption (viewing and/or listening) by a user. In other embodiments, the media content is permanently or semi-permanently transferred (such as in the case with a purchase) from media server 260 to a connected network enabled media device.

Example System for Displaying a Catalog of Media Content

Figure 3:
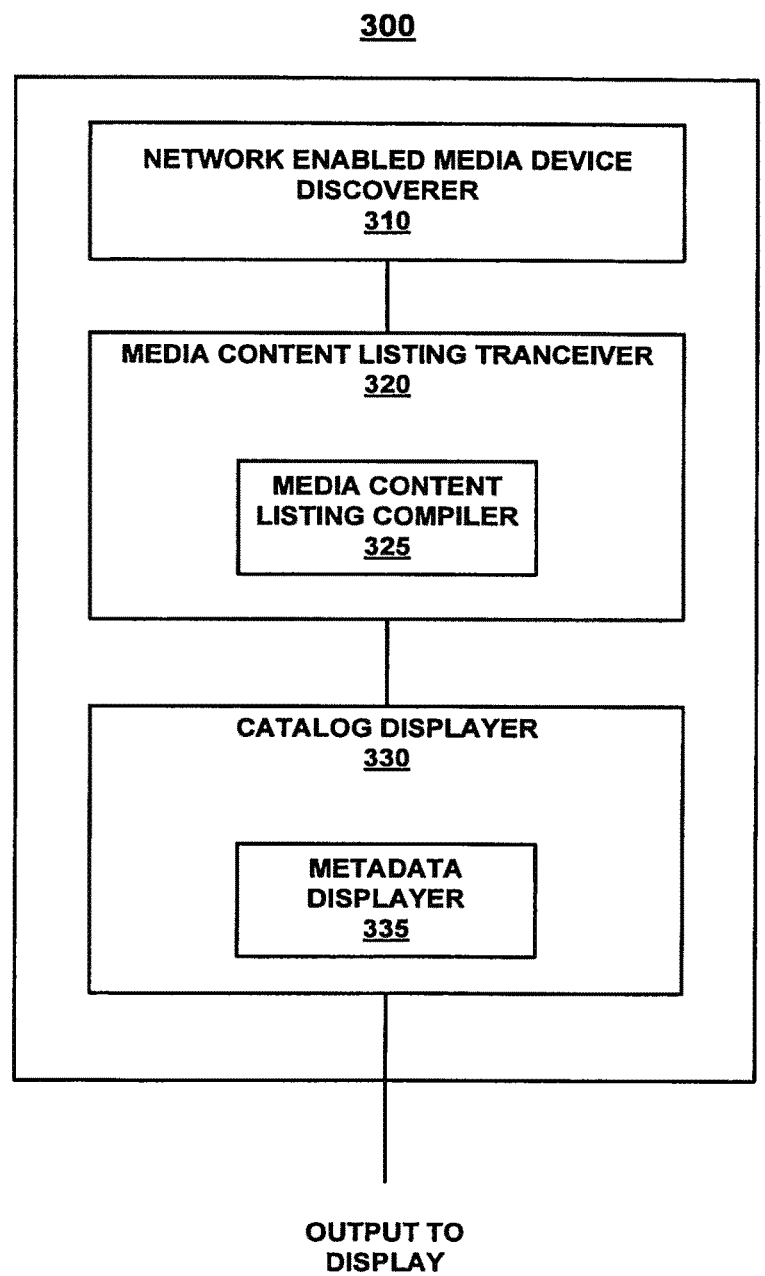
FIG. 3 is a block diagram of an example system for displaying a media content catalog, in accordance with an embodiment of the present.

FIG. 3 shows a block diagram of components of an example system 300 which displays a catalog of media content, according to various embodiments of the present technology. With respect to structure, system 300 is comprised of a network enabled media device discoverer 310, a media content listing transceiver 320, and a catalog displayer 330. In embodiments of the present technology, network enabled media devices as described herein (such as those displayed in FIG. 2) are configured with a system 300, or a similar system, for displaying a catalog of media content.

Network enabled media device discoverer 310 is configured for discovering and establishing communications with a one or more additional network enabled media devices that are present within an environment (for example, within range of wireless connectivity) or that may be coupled to via a wired or wireless network such as, for example. a home network or the internet. In one embodiment, network enabled media device discoverer 310 actively searches for other network enabled media devices such as by transmitting and receiving discovery messages. In one embodiment, network enabled media device discoverer 310 only actively searches for other network enabled media devices such when so directed by a user input.

Media content listing transceiver 320 is coupled to network enabled media device discoverer 310. After communication is established with a discovered network enabled media device, media content listing transceiver 320 is configured to receive a media content listing from the discovered media device. This may comprise requesting that the media content listing be sent from the discovered network enabled media device. In one embodiment, this may also comprise sending one or more media content listings to the discovered network enabled media device, either automatically or in response to a request for a media content listing. This is an example of sharing media content listings.

In one embodiment, media content listing transceiver 320 is configured with a media content listing compiler 325 which compiles a plurality of media content listings into a catalog of media content. For example, in one embodiment, media content listing compiler 325 compiles media content listings received from commonly owned network enabled media devices into a personal catalog of media content. In one embodiment, media content listing compiler 325 compiles media content listings received from commonly owned network enabled media devices and non-commonly owned network enabled media devices into a shared catalog of media content.

It is appreciated that in one embodiment, media content listing transceiver 320 may supply a media content listing to media service and receive a personal catalog of media content or a shared catalog of media content in return. In such an embodiment, media content listing compiler 325 may not be utilized.

Catalog displayer 330 is coupled to media content listing transceiver 320. In one embodiment, catalog displayer 330 configures a catalog of media content (such as a shared catalog of media content or a personal catalog of media content) supplied by media content listing transceiver 320 for output to display on a display device. This can comprise configuring the catalog of media content to fit the display of the network enabled media device upon which system 300 is operating, or configuring the catalog of media content for export to a display external to the network enabled media device upon which system 300 is operating.

In one embodiment, catalog displayer 330 is configured with a metadata displayer 335. Metadata displayer 335 configures for display, on the display device, one or more items of metadata regarding a media item of the catalog of media content. In various embodiments, as will be described further herein, metadata displayer configures metadata for display such as metadata regarding, but not limited to: media item personal ownership information metadata, media item location information metadata, media item digital rights information metadata, and media item availability information metadata.

Example Methods of Operation

The following discussion sets forth in detail the operation of present technology for media content catalogs. With reference to FIG. 4 and FIG. 8, flow diagrams 400 and 800 each illustrate example steps used by various embodiments of the present technology for media content catalogs. Flow diagrams 400 and 800 include processes that, in various embodiments, are carried out by a processor under the control of computer-readable and computer-executable instructions. The computer-readable and computer-executable instructions reside, for example, in data storage features such as computer usable volatile memory 108, computer usable non-volatile memory 110, data storage unit 112, and/or peripheral computer-readable media 102 of FIG. 1. The computer-readable and computer-executable instructions are used to control or operate in conjunction with, for example, processor 106A and/or processors 106A, 106B, and 106C of FIG. 1. Although specific steps are disclosed in flow diagrams 400 and 800, such steps are examples. That is, embodiments are well suited to performing various other steps or variations of the steps recited in flow diagrams 400 and 800. It is appreciated that the steps in flow diagrams 400 and 800 may be performed in an order different than presented, and that not all of the steps in flow diagrams 400 and 800 may be performed.

Displaying a Catalog of Media Content on a Display Device

FIG. 4 is a flow diagram 400 of operations performed in accordance with one embodiment of the present technology for media content catalogs. More specifically, FIG. 4 illustrates a flow diagram 400 of an example embodiment of a method in a computer system for displaying on a display device a catalog of media content. Elements of system 300 and flow diagram 400 are explained below, with reference to elements of FIG. 2, FIG. 5, FIG. 6, and FIG. 7.

At step 410 of flow diagram 400, in one embodiment, the method receives a plurality of media content listings from a plurality of network enabled media devices of common ownership to the computer system. For purposes of example and not of limitation, PMD 210 of FIG. 2 may be considered an embodiment of computer system 100 and may also be considered to be the computer system referred to in step 410. In one embodiment, PMD 210 is configured with system 300. PMD 210 utilizes network enabled media device discoverer 310 to discover and establish communication with DVD 230 and IPTV 220 which are within wireless connectivity range of PMD 210. In one embodiment, PMD 210 also couples with network 290 and utilizes network enabled media device discoverer 310 to discover and establish communication with PC 240 which is outside of wireless communication range of PMD 210, but yet remotely accessible via network 290. After coupling with one or more network enabled media devices, PMD 210 utilizes media content listing transceiver 320 to request and receive one or media content listings.

Figure 5:
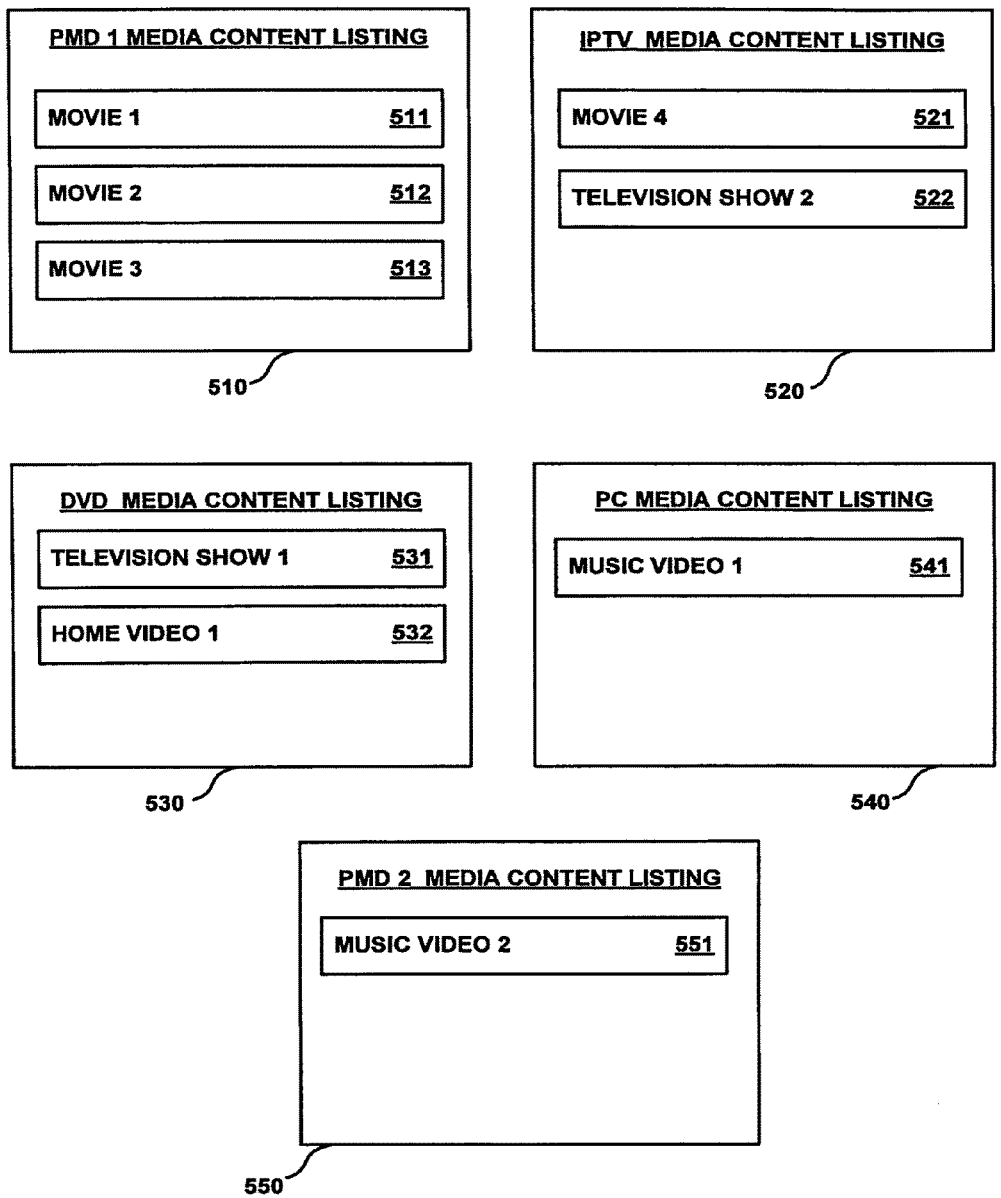
FIG. 5 shows examples of media content listings for the network enabled media devices of FIG. 4, in accordance with an embodiment of the present technology.

In one embodiment, step 410 comprises receiving a media content listing of media items resident on at least one network enabled media device of the plurality of network enabled media devices of common ownership to the computer system. In one embodiment, for example, this comprises PMD 210 utilizing media content listing transceiver 320 to receive a media content listing of media items resident on PC 240. With reference to FIG. 5, media content listing 540 shows that music video 1 (541) is resident on PC 240.

In one embodiment, step 410 comprises, receiving a media content listing of network delivered media items accessed through at least at least one of the plurality of network enabled media devices of common ownership to the computer system. In one embodiment, for example, this comprises PMD 210 utilizing media content listing transceiver 320 to receive a media content listing of media items resident on IPTV 220. With reference to FIG. 5, media content listing 520 shows that movie 4 (521) and television show 2 (522) are resident on or have been accessed by IPTV 220.

In one embodiment, step 410 comprises receiving a media content listing of physical media items played on at least at least one of the plurality of network enabled media devices of common ownership to the computer system. In one embodiment, for example, this comprises PMD 210 utilizing media content listing transceiver 320 to receive a media content listing of media items played on DVD 230. With reference to FIG. 5, media content listing 530 shows that television show 1 (531) and home video 2 (532) are resident in or have been played on DVD 230. For purposes of example, is it assumed that DVD 230 keeps an historical listing of media items it has played.

At step 420, in one embodiment, the method utilizes the plurality of media content listings and a media content listing of the computer system to compile a personal catalog of media content, wherein the computer system comprises a network enabled media device. In one embodiment, this comprises PMD 210 utilizing media content listing compiler 325 to compile the plurality of received media content listings with a media content listing of media items on PMD 210. With reference to FIG. 5, media content listing 510 shows that movie 1 (511), movie 2 (512), and movie 3 (513) are the media content items resident on personal media device 210. Thus, in the example embodiment, PMD 210 utilizes media content listing compiler 325 to compile media content listing 510, media content listing 520, media content listing 530, and media content listing 540 into a personal catalog of media content. The personal catalog of media content is "personal" in that it catalogs the media items that a user owns, has viewed, or has rights to across a plurality of the user's commonly owned network enabled media devices which are in communication.

Figure 6:
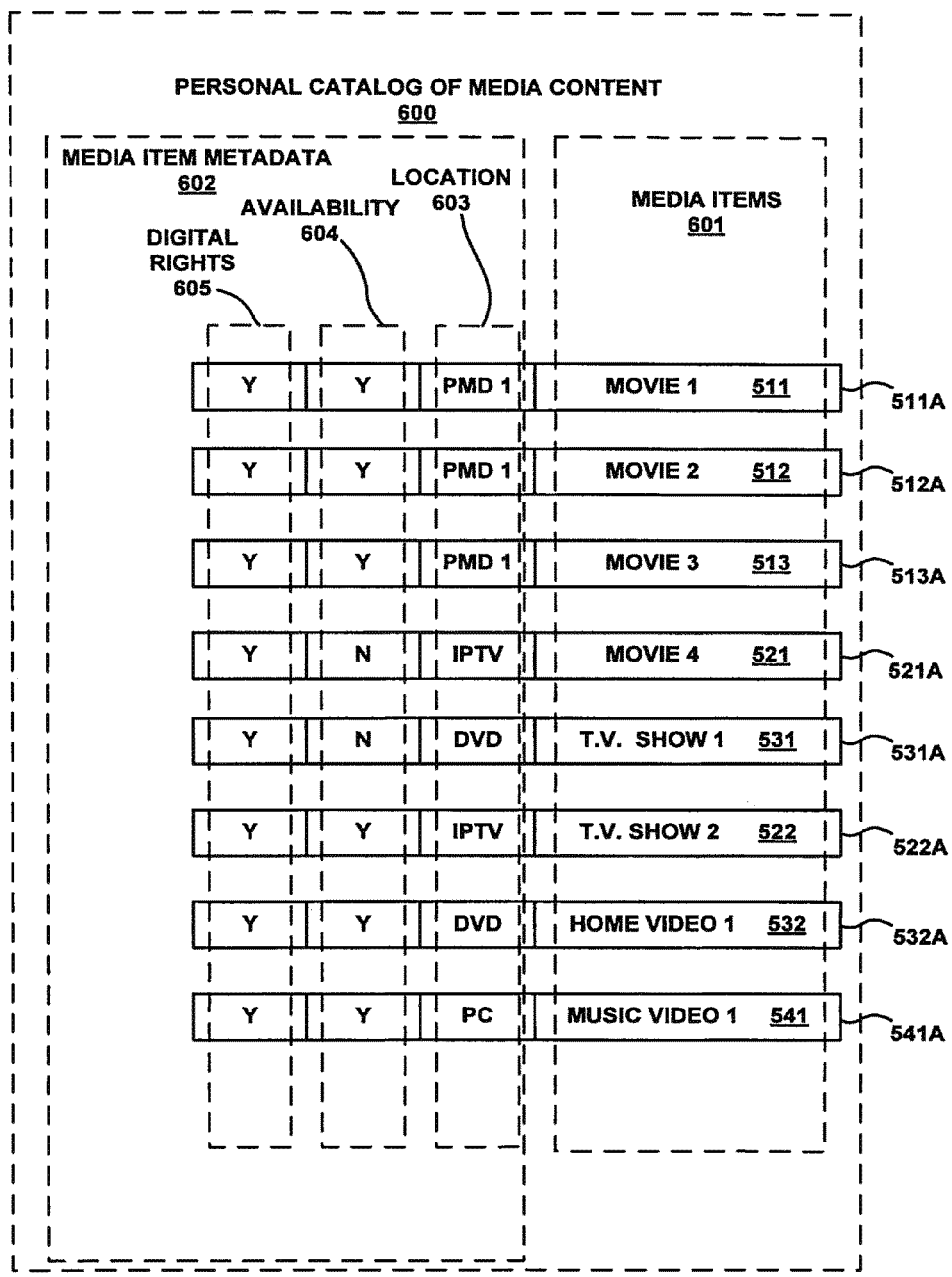
FIG. 6 is an example of a personal catalog of media content, according to one embodiment of the present technology.

FIG. 6 is an example of a personal catalog of media content according to one embodiment. As shown in FIG. 6, media content listings 510, 520, 530, and 540 are compiled in to a single personal catalog of media content 600 which allows a user to easily see all of the media content that is resident, has been played on, or has been accessed by commonly owned network enabled media devices which are in communication with one another.

Personal catalog of media content 600 comprises a listing the union of a plurality of media items 601 from media content listings 510, 520, 530, and 540 along with elements of media item metadata 602. Each media item (511, 512, 513, 521, 522, 531, 532, and 541) from the media content listings 510, 520, 530, and 540 has a like numbered line (511A, 521A, 513A, 521A, 522A, 531A, 532A, and 541A) in personal catalog of media content 600. Each line in personal catalog of media content 600 comprises a media item 601 and available metadata 602 regarding the media item. For instance, line 511A is comprised of a media item 511 (movie 1), location metadata 603 (located on PMD 1 (PMD 210)), availability metadata 604 ("Y"es, it is available for viewing), and digital rights metadata 605 ("Y"es, digital rights are owned by the user).

At step 430, in one embodiment, the method displays the personal catalog of media content on the display device. In the present example, in one embodiment, this comprises PMD 210 utilizing catalog displayer 330 to display at least the compiled media items 601 of personal catalog of media content 600 on display 211 of PMD 210. In another embodiment, this may comprise exporting at least the compiled media items 601 of personal catalog of media content 600 for display on a display external to PMD 210, such as display 225 or display 241.

In one embodiment, step 430 comprises displaying digital rights metadata for a media item of the personal catalog of media content. For example, in one embodiment, this comprises PMD 210 utilizing metadata displayer 335 to display the digital rights metadata 605 for media item 511 as shown on line 511A of FIG. 6. It is appreciated that in other embodiments, digital rights metadata may be displayed for additional media items. It is also appreciated that digital rights metadata may be displayed in a variety of manners, some of which are illustrated and discussed in conjunction with FIG. 9.

In one embodiment, step 430 comprises displaying availability metadata for a media item of the personal catalog of media content. For example, in one embodiment, this comprises PMD 210 utilizing metadata displayer 335 to display the availability metadata 604 for media item 511 as shown on line 511A of FIG. 6. It is appreciated that in other embodiments, availability metadata may be displayed for additional media items. It is also appreciated that availability metadata may be displayed in a variety of manners, some of which are illustrated and discussed in conjunction with FIG. 9.

In one embodiment, step 430 comprises displaying location metadata for a media item of the personal catalog of media content. For example, in one embodiment, this comprises PMD 210 utilizing metadata displayer 335 to display the location metadata 603 for media item 511 as shown on line 511A of FIG. 6. It is appreciated that in other embodiments, location metadata may be displayed for additional media items. It is also appreciated that location metadata may be displayed in a variety of manners, some of which are illustrated and discussed in conjunction with FIG. 9.

Displaying elements of personal catalog of media content 600 allows a user to see an historical listing of the items of content they possess, have rights to, or have previously possessed, consumed or had rights to. Additionally, displaying elements of personal catalog of media content 600 allows a user to see what media device each item of content resides upon or was accessed through. Thus, through use of personal catalog of media content 600, a user can easily and advantageously make informed decisions or gain information regarding: whether or not purchase or re-purchase an item of media content; what format or device to purchase the media content for; where the media content may already exist; and/or whether (and if it is possible) to transfer a media content item from one media device to another.

In one embodiment, the method of flow diagram 400 further comprises recompiling the personal catalog of media content to maintain currency of the personal catalog of media content. This can comprise, for example, re-accomplishing elements of steps 410, 420, and 430 on a periodic basis, or when there is some indication of a new item of media content to be added to a personal catalog of media content.

In one embodiment, the method of flow diagram 400 further comprises receiving an external media content listing from a network enabled media device outside of the plurality of network enabled media devices of common ownership. The method then utilizes the personal catalog of media content and the external media content listing to compile a shared catalog of media content. The method then displays the shared catalog of media content on the display device.

With reference to FIG. 2, in one embodiment, if PMD 210 is physically moved from environment one (201) to environment three (203) (i.e. from a user's home to a coffee shop in this example), PMD 210 can discover and initiate communication with PMD 250, in the manner previously described. It bears repeating that in this example, PMD 210 and PMD 250 are not commonly owned by the same user. After PMD 210 discovers and couples with PMD 250, PMD 210 receives a media content listing from PMD 240 in the manner previously described. With reference to FIG. 5, media content listing 550 shows an example of an external media content listing received from PMD 250. The media content listing is "external" in that it is from a network enabled media device which is not owned by the same owner as PMD 210. As shown, media content listing 550 comprises music video 2 (551). PMD 210 then utilizes media content listing compiler 325 to compile a shared catalog of media content from personal catalog of media content 600 and external media content listing 550 received from PMD 250.

Figure 7:
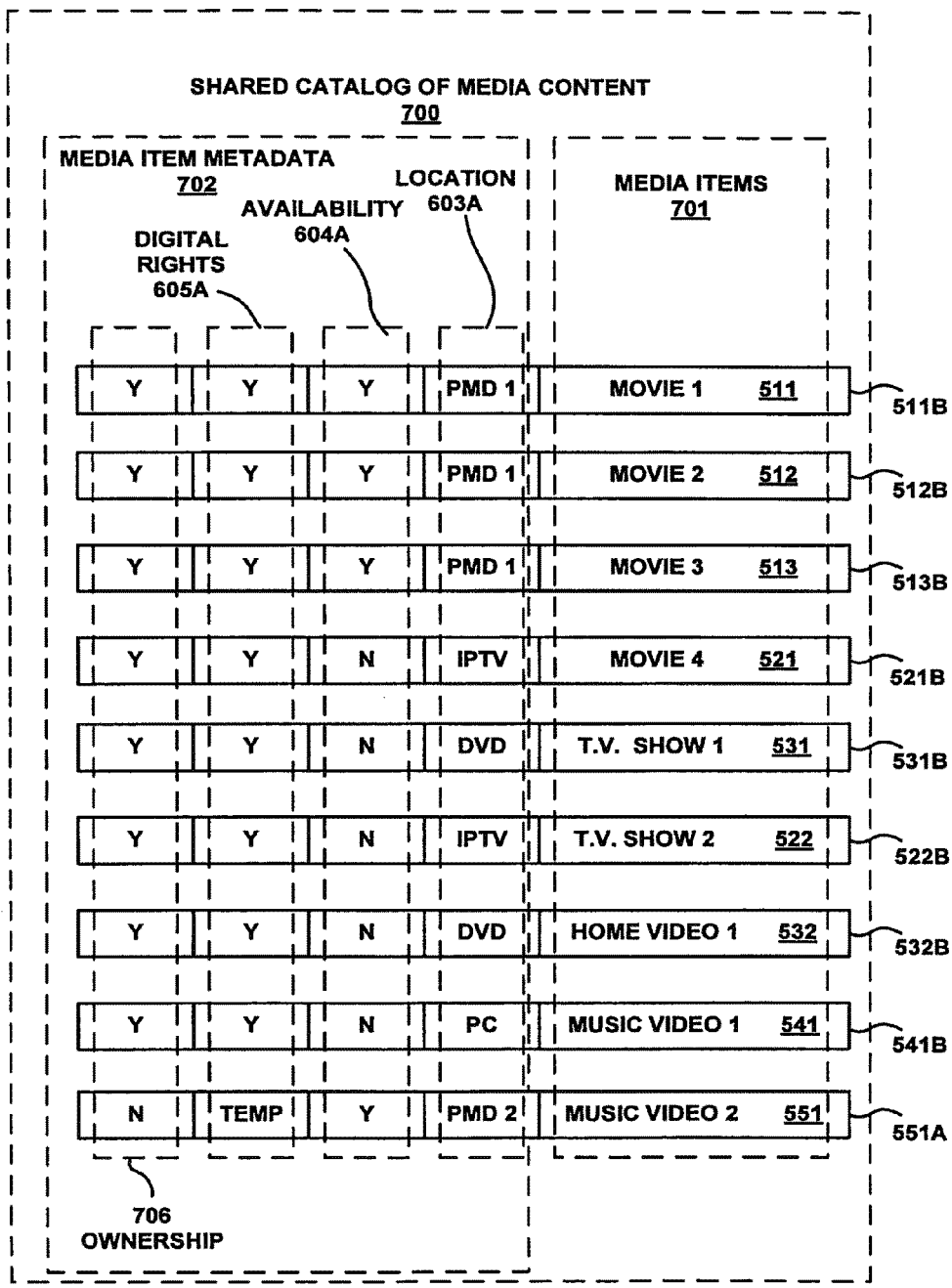
FIG. 7 is an example of a shared catalog of media content, according to one embodiment of the present technology.

FIG. 7 shows an example of a shared catalog of media content 700. In shared catalog of media content 700, like numbers to personal catalog of media 600 content are the same. Shared catalog of media content 700 is very similar to personal catalog of media content 600 and offers the same advantages. One difference is that media items 701 comprise an additional media item, music video 2 (551), which was not present in media items 601. Another difference is that, media item metadata 702 comprises an element of ownership metadata 706 for each of media items 701.

Shared catalog of media content 700 comprises a listing of the union of a plurality of media items 701 from personal catalog of media content 600 and external media content listing 550, along with elements of media item metadata 702. Each media item (511, 512, 513, 521, 522, 531, 532, 541, and 551) from personal catalog of media content 600 and external media content listing 550 has a like numbered line (511B, 512B, 513B, 521B, 522B, 531B, 532B, 541B, and 551A) in shard catalog of media content 700. Each line in shared catalog of media content 700 comprises a media item 701 and available metadata 702 regarding the media item.

For instance, line 511B is comprised of a media item 511 (movie 1); location metadata 603A (located on PMD 1 (PMD 210)); availability metadata 604A ("N"o, it is not available for viewing); digital rights metadata 605A ("Y"es, digital rights are owned by the user); and ownership metadata 706 ("Y"es, this media item is owned by the user of PMD 210). Similarly, line 541B is comprised of a media item 541 (music video 1); location metadata 603A (located on PC 240); availability metadata 604A ("N"o, it is not available for viewing, due to the lack of a connection to network 290 from environment three (203)); digital rights metadata 605A ("Y"es, digital rights are owned by the user); and ownership metadata 706 ("Y"es, this media item is owned by the user of PMD 210). Similarly, line 551A is comprised of a media item 551 (music video 2); location metadata 603A (located on PMD 2 (PMD 250); availability metadata 604A ("Y"es, it is available for viewing); digital rights metadata 605A ("Temp"orary, digital rights are owned by the user of PMD 210 while this item is being shared from PMD 250); and ownership metadata 706 ("N"o, this media item is not owned by the user of PMD 210).

PMD 210 then displays shared catalog of media content 700 on the display device. In the present example, in one embodiment, this comprises PMD 210 utilizing catalog displayer 330 to display at least the compiled media items 701 of shared catalog of media content 700 on display 211 of PMD 210. In another embodiment, this may comprise exporting at least the compiled media items 701 of shared catalog of media content 700 for display on a display external to PMD 210. In various embodiments, this also comprises displaying one or more elements of media item metadata 702, such as location metadata 603A, availability metadata 604A, and/or digital rights metadata 605A in the manner previously described. In one embodiment, this also comprises displaying an element of ownership metadata 706. For example, in one embodiment, this comprises PMD 210 utilizing metadata displayer 335 to display the ownership metadata 705 for media item 551 as shown on line 551A of FIG. 7. It is appreciated that in other embodiments, availability metadata may be displayed for additional media items.

Compiling a Personal Catalog of Media Content

FIG. 8 is a flow diagram 800 of operations performed in accordance with one embodiment of the present technology for media content catalogs. More specifically, FIG. 8 illustrates a flow diagram 800 of an example embodiment of a method for compiling a personal catalog of media content. Elements of system 300 and flow diagram 800 are explained below, with reference to elements of FIG. 2, FIG. 5, FIG. 6, FIG. 7, and FIG. 9, and steps of flow diagram 400 of FIG. 4.

At step 810 of flow diagram 800, in one embodiment, the method utilizes a first network enabled media device to discover a second network enabled media device of common ownership. With reference to FIG. 2 and FIG. 3, in one embodiment, for example, PMD 210 utilizes network enabled media device discoverer 310 to discover and establish communication with IPTV 220 (which is a network enabled media device of common ownership to PMD 210). This is done in a manner consistent with previous description of this operation.

At step 820 of flow diagram 800, in one embodiment, the method utilizes a union of a media content listing from the first network enabled media device and a media content listing from the second network enabled media device to compile a personal catalog of media content. The personal catalog of media content is "personal" in that it catalogs the media items that a user owns, has viewed, or has rights to across a plurality of the user's commonly owned network enabled media devices which are in communication.

In one embodiment, step 820 comprises receiving the media content listing from the second network enabled media device at the first network enabled media device. The method then utilizes the first network enabled media device to compile the media content listing from the first network enabled media device and the media content listing from the second network enabled media device into the personal catalog of media content.

Following the previous example, in one embodiment, step 820 comprises PMD 210 utilizing media content listing transceiver 320 to receive a media content listing of media items resident on IPTV 220. With reference to FIG. 5, media content listing 520 shows that movie 4 (521) and television show 2 (522) are resident on IPTV 220. Likewise, media content listing 510 shows that movie 1 (511), movie 2 (512), and movie 3 (513) are resident on PMD 210. In one such embodiment, PMD 210 utilizes media content listing compiler 325 to compile media content listings 510 and 520 into a personal catalog of media content. The compiled catalog is similar to personal catalog of media content 600, except that lines 521A, 522A, and 541A are absent because PMD 210 has not received and compiled media content lists from DVD 230 and PC 240.

In another embodiment, step 820 comprises receiving the media content listing from the first network enabled media device at a network media service and receiving the media content listing from the second network enabled media device at the network media service. The method then utilizes the network media service to compile the media content listing from the first network enabled media device and the media content listing from the second network enabled media device into the personal catalog of media content.

Following the previous example, in one embodiment, step 820 comprises PMD 210 utilizing media content listing transceiver 320 to send media content listing 510 via network 290 to media server 260. Likewise, in such an embodiment, IPTV 220 also utilizes its own media content listing transceiver 320 to sent media content listing 520 via network 290 to media server 260. Media server 260 utilizes its own media content listing compiler 325 to compile media content listings 510 and 520 into a personal catalog of media content. The compiled catalog is similar to personal catalog of media content 600, except that lines 521A, 522A, and 541A are absent because media server 260 has not received and compiled media content lists from DVD 230 and PC 240. In one embodiment, the personal catalog of media content is then sent from media server 260 to, for example, PMD 210.

At step 830 of flow diagram 800, in one embodiment, the method includes displayable media item metadata in the personal catalog of media content. With reference to FIG. 6, in one embodiment, for example this comprises PMD 210 or media server 260 utilizing its respective metadata displayer 335 to include displayable location metadata 603, displayable availability metadata 604, and/or displayable digital rights metadata 605 for a media item in a personal catalog of media content. As will be described, such media item metadata is not limited to being displayed as alphanumeric characters and icons, but can also be displayed through various means of manipulating the font, shading, and coloring of displayed textual information regarding a media item.

In one embodiment, the method of flow diagram 800 further comprises displaying the personal catalog of media content on a display device associated with the first network enabled media device. This is performed in a similar fashion to step 430 of flow diagram 400. Thus, in one embodiment, PMD 210 utilizes catalog displayer 330 to format a self-compiled or received personal catalog of media content for display upon display 211.

Figure 9:
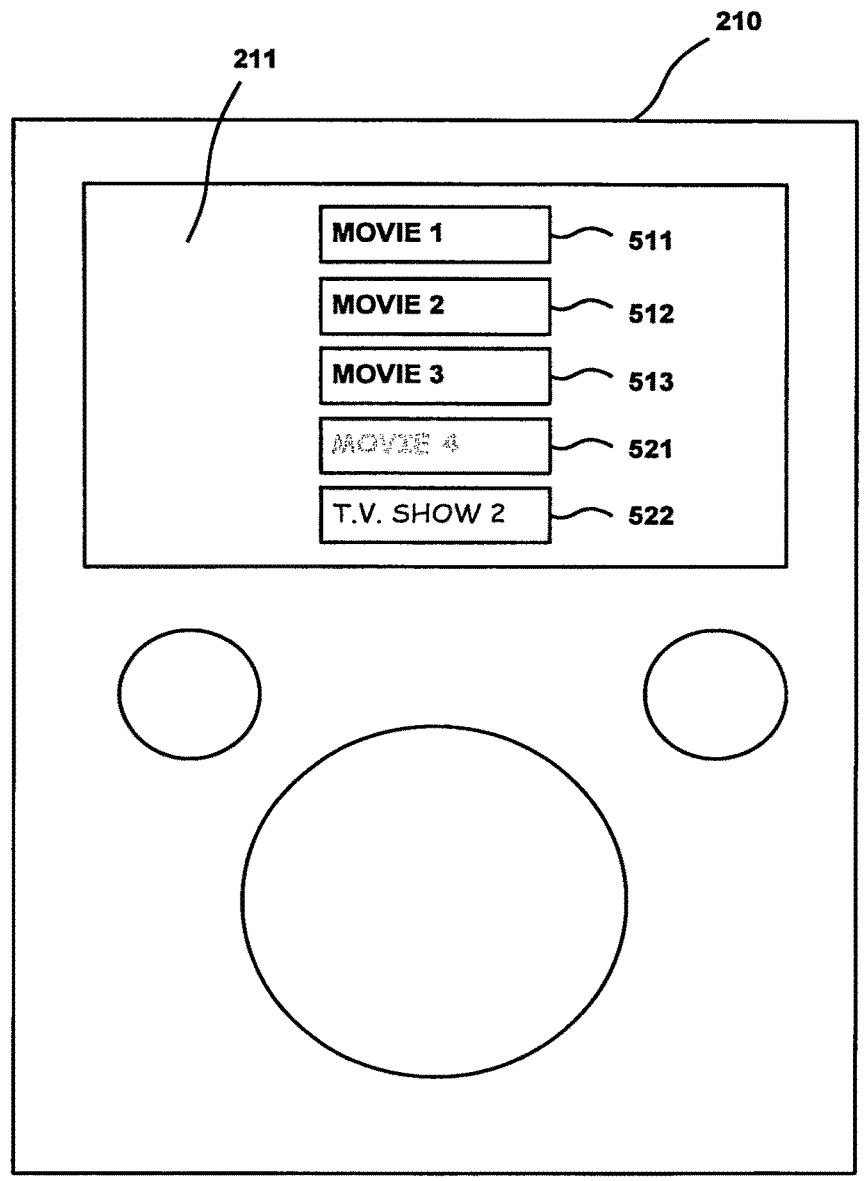
FIG. 9 shows an example of a catalog of media content displayed in accordance with an embodiment of the present technology.

FIG. 9 shows an example of a catalog of media content (such as a personal catalog of media content or a shared catalog of media content as described herein) displayed on a display, in accordance with step 430 of flow diagram 400 or in accordance with an embodiment of the method of flow diagram 800. More specifically, in FIG. 9, media items of a personal catalog of media content are displayed. FIG. 9 illustrates the display of the personal catalog of media content discussed in conjunction with the examples used to illustrate the method of flow diagram 800. Thus in FIG. 9, the following media items are displayed on display device 211 of PMD 210: movie 1 (511), movie 2 (512), movie 3 (513), movie 4 (521), and television show 2 (522).

As shown by lines 511A, 512A, and 513A of personal catalog of media content 600 (FIG. 6), movie 1 (511), movie 2 (512), and movie 3 (513) are available for viewing and are located on PMD 210. Thus, movie 1 (511), movie 2 (512), and movie 3 (513) are displayed in a similar "normal" manner (font, color, and shade) to visually indicate similar metadata about their similar availability and similar location.

As shown by line 521A of personal catalog of media content 600 (FIG. 6), movie 4 (521) is not available for viewing on PMD 210 and is located on or was accessed by IPTV 220. Thus, movie 4 (521) is displayed in a subdued manner, or is "grayed-out", to visually indicated metadata about its unavailability. Additionally, in one embodiment, movie 4 (521) may be displayed in a different color, different grayed-out shade, or different font (as shown) from "normal" to indicate its location on a network enabled media device other than PMD 210.

As shown by line 522A of personal catalog of media content 600 (FIG. 6), television show 2 (522) is available for viewing but is located on or was accessed by IPTV 220. Thus, television show 2 (522) is displayed a different color or font (shown) from "normal" to indicate its location on a network enabled media device other than PMD 210.

It is appreciated that in other embodiments, such manipulation of the font, color, shading or other characteristics of textual information of a displayed media item may be employed to display other media item metadata. Likewise, though not shown in FIG. 9, it is appreciated that symbols, icons, and alphanumeric characters may also be used to display media item metadata in some embodiments.

Although the method of flow diagram 800 is directed to a coupling and interchange of information between two network enabled media devices, it is appreciated that the concepts illustrated may be extended such that a network enabled media device couples with and exchanges information, such as media content listings, with a larger plurality of network enabled media devices.

Example embodiments and advantages of the present technology for media content catalogs are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method in a computer system for displaying on a display device a catalog of media content, said method comprising:
   receiving a plurality of media content listings from a plurality of network enabled media devices of common ownership to said computer system;
   utilizing said plurality of media content listings and a media content listing of said computer system to compile a personal catalog of media content, wherein said personal catalog including personal ownership information of at least one of said plurality of media items indicating whether said media item is owned by a user of the display device;
   receiving an external media content listing from a network enabled media device outside of said plurality of network enabled media devices of common ownership;
   utilizing said personal catalog and said external media content listing to compile a shared catalog of media content; and
   displaying said shared catalog of media content on said display device.

2. The method as recited in claim 1, wherein receiving a plurality of media content listings from a plurality of network enabled media devices of common ownership to said computer system comprises:
   receiving a media content listing of media items resident on at least one network enabled media device of said plurality of network enabled media devices of common ownership to said computer system.

3. The method as recited in claim 1, wherein said receiving a plurality of media content listings from a plurality of network enabled media devices of common ownership to said computer system comprises:
   receiving a media content listing of network delivered media items accessed through at least at least one of said plurality of network enabled media devices of common ownership to said computer system.

4. The method as recited in claim 1, wherein said receiving a plurality of media content listings from a plurality of network enabled media devices of common ownership to said computer system comprises:
   receiving a media content listing of physical media items played on at least at least one of said plurality of network enabled media devices of common ownership to said computer system.

5. The method as recited in claim 1, wherein said displaying said shared catalog of media content on said display device comprises:

displaying personal ownership metadata for a media item of said shared catalog of media content.

6. The method as recited in claim 1, wherein said displaying said shared catalog of media content on said display device comprises:
displaying digital rights metadata for a media item of said shared catalog of media content.

7. The method as recited in claim 1, wherein said displaying said shared catalog of media content on said display device comprises:
displaying availability metadata for a media item of said shared catalog of media content.

8. The method as recited in claim 1, wherein said displaying said shared catalog of media content on said display device comprises:
displaying location metadata for a media item of said shared catalog of media content.

9. The method as recited in claim 1 further comprising:
recompiling said shared catalog of media content to maintain currency of said shared catalog of media content.

10. An article of manufacture comprising a computer-usable storage device containing instructions which when executed cause a computer system to perform a method for compiling a personal catalog of media content, said method comprising:
utilizing a first network enabled media device to discover a second network enabled media device of common ownership;
receiving an external media content listing from a network enabled media device outside of said plurality of network enabled media devices of common ownership;
utilizing a union of a media content listing from said first network enabled media device, a media content listing from said second network enabled media device, and the external media content listing to compile a shared catalog of media content, wherein said shared catalog including ownership information of a plurality of media items indicating whether a media item is owned by a user of the network enabled media device, a user of the second network enabled media device, or the external media device; and
storing displayable media item metadata in said shared catalog of media content.

11. The article of claim 10, wherein said utilizing a union of a media content listing from said first network enabled media device, a media content listing from said second network enabled media device, and the external media content listing to compile a shared catalog of media content comprises:
receiving said media content listing from said second network enabled media device at said first network enabled media device; and
utilizing said first network enabled media device to compile said media content listing from said first network enabled media device and said media content listing from said second network enabled media device into said shared catalog of media content.

12. The article of claim 10, wherein said utilizing a union of a media content listing from said first network enabled media device, a media content listing from said second network enabled media device, and the external media content listing to compile a shared catalog of media content comprises:
receiving said media content listing from said first network enabled media device at a network media service;
receiving said media content listing from said second network enabled media device at said network media service; and
utilizing said network media service to compile said media content listing from said first network enabled media device and said media content listing from said second network enabled media device into said shared catalog of media content.

13. The article of claim 10, wherein said including displayable media item metadata in said shared catalog of media content comprises:
including displayable digital rights metadata for a media item of said shared catalog of media content.

14. The article of claim 10, wherein said including displayable media item metadata in said personal catalog of media content comprises:
including displayable availability metadata for a media item of said shared catalog of media content.

15. The article of claim 10, wherein said including displayable media item metadata in said shared catalog of media content comprises:
displaying location metadata for a media item of said shared catalog of media content.

16. The article of claim 10, wherein said method further comprises:
displaying said shared catalog of media content on a display device associated with said first network enabled media device.

17. A network enabled media device comprising:
a network enabled media device discoverer configured for discovering a second network enabled media device in an environment;
a media content listing transceiver coupled to said network enabled media device discoverer, said media content listing transceiver configured for receiving a media content listing from a discovered media device that is not owned by a same owner as the network enabled media device and utilizing said media content listing and a media content listing of said network enabled media device to compile a shared catalog of media content; and
a catalog displayer coupled to said media content listing transceiver, said catalog displayer configured for displaying the shared catalog of media content supplied by said media content listing transceiver.

18. The network enabled media device of claim 17, wherein said media content listing transceiver further comprises:
a media content listing compiler configured for compiling a plurality of media content listings from said discovered media device into a catalog of media content.

19. The network enabled media device of claim 17, wherein said catalog displayer further comprises a metadata displayer configured for displaying metadata regarding a media item of said catalog of media content, said metadata selected from a list of metadata consisting of:
personal ownership information, location information, digital rights information, and availability information.

20. The method of claim 1 wherein the media content listing comprises an historical list of media items played on a media device.